(12) United States Patent
William et al.

(10) Patent No.: US 7,783,536 B2
(45) Date of Patent: Aug. 24, 2010

(54) APPARATUS AND METHOD CONFIGURABLE FOR LOCAL JURISDICTIONS THAT FACILITATES DETERMINING TAXES

(75) Inventors: Isaac J. William, Santa Clara, CA (US); Alexander O. Fiteni, Hayward, CA (US); Paulo Back, Redwood Shores, CA (US); Harshavardhan Takle, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1333 days.

(21) Appl. No.: 10/617,349

(22) Filed: Jul. 9, 2003

(65) Prior Publication Data

US 2004/0019541 A1    Jan. 29, 2004

Related U.S. Application Data

(60) Provisional application No. 60/398,769, filed on Jul. 26, 2002.

(51) Int. Cl.
*G06F 17/22* (2006.01)
(52) U.S. Cl. .................. 705/31; 705/19; 705/36 R; 705/417
(58) Field of Classification Search .............. 705/31, 705/19, 36 R, 417
See application file for complete search history.

(56) References Cited

U.S. PATENT DOCUMENTS

| 5,335,169 | A | 8/1994 | Chong ................. 364/408 |
| 5,946,668 | A * | 8/1999 | George ................. 705/36 R |
| 6,064,983 | A | 5/2000 | Koehler ................. 705/31 |
| 6,078,899 | A | 6/2000 | Francisco et al. ............ 705/19 |
| 6,128,274 | A | 10/2000 | Mori et al. .............. 369/275.5 |
| 6,298,333 | B1 * | 10/2001 | Manzi et al. .............. 705/31 |
| 2003/0055754 | A1 * | 3/2003 | Sullivan .................. 705/31 |
| 2003/0093320 | A1 * | 5/2003 | Sullivan .................. 705/19 |
| 2003/0101112 | A1 * | 5/2003 | Gallagher et al. ............ 705/31 |
| 2003/0126018 | A1 * | 7/2003 | LaMotta et al. .............. 705/19 |
| 2003/0144931 | A1 * | 7/2003 | Stokes et al. .............. 705/31 |
| 2005/0055290 | A1 * | 3/2005 | Bross et al. .............. 705/31 |
| 2005/0119955 | A1 * | 6/2005 | Dang et al. .............. 705/31 |

\* cited by examiner

*Primary Examiner*—Vanel Frenel
(74) *Attorney, Agent, or Firm*—Park, Vaughan & Fleming LLP; Edward J. Grundler

(57) ABSTRACT

One embodiment of the present invention provides a system for determining taxes that is configurable for local jurisdictions. The system includes a tax knowledge base that provides the facility to store data pertaining to taxes in local jurisdictions, and a tax rule base that provides the facility to store rules for applying taxes in local jurisdictions. The system also includes a tax determination manager that determines the tax for a transaction using the tax knowledge base and, optionally, the tax rule base.

30 Claims, 5 Drawing Sheets

APPARATUS AND METHOD CONFIGURABLE FOR LOCAL JURISDICTIONS THAT FACILITATES DETERMINING TAXES

RELATED APPLICATION

This application hereby claims priority under 35 U.S.C. §119 to U.S. Provisional Patent Application No. 60/398,769, filed on Jul. 26, 2002, entitled "Apparatus and Method Configurable For Local Jurisdictions That Facilitates Determining Taxes," by inventors Isaac J. William and Alexander O. Fiteni. The subject matter of this application is also related to the subject matter in a co-pending non-provisional application entitled, "Method and Apparatus for Providing a Tax Service that is Configurable for Local Jurisdictions," by Alexander O. Fiteni, Paulo V. Back, Isaac J. William, Harshavardhan Takle, Desh Deepak, and Roberto vono Silva, having Ser. No. 10/106,729, and filing date Mar. 26, 2002.

BACKGROUND

1. Field of the Invention

The present invention relates to computer-based systems for calculating and administering taxes. More specifically, the present invention relates to an apparatus and a method for determining taxes that is configurable for local jurisdictions.

2. Related Art

As companies expand their businesses beyond national borders and into the global marketplace, it is becoming increasingly harder to ensure that taxes are accurately determined. Determining taxes and managing tax compliance on a global scale is an enormously complicated task because each legislature with a right to levy taxes within its jurisdictional boundaries can establish its own set of taxes, as well as its own set of rules for regulating tax compliance. For example, in the United States alone there are over 6,000 individual jurisdictions that have the right to levy taxes, and perhaps that many more again worldwide.

The nature, the extent and the sophistication of the information required to calculate taxes varies from jurisdiction to jurisdiction. This makes the codification and structuring of such information in a manner amenable to being understood by a computer-based system very difficult. Consequently, existing computer-based systems for managing tax compliance are custom-built for each jurisdiction, or, at best, for a group of jurisdictions. This requires large amounts of programmer time to build systems for each jurisdiction, which can result in a considerable expense to the company building the computer-based system. In addition, companies that use computer-based systems for processing taxes (hereafter called "deploying companies") cannot streamline their processes or achieve economies of scale. Also, deploying companies need to incur additional costs in integrating their business-processing computer programs with many computer-based systems for processing taxes. Moreover, adding new countries or complying with new taxes/genre of taxes in a country already supported or complying with new rules for currently supported taxes involves producing yet even more [program] code, and consequently requires even more programmer time. Unfortunately, much of this programmer time is wasted because similar solutions are typically developed for each of the different jurisdictions.

Moreover, tax rules continually change for each jurisdiction. Hence, the underlying code for a computer-based tax management system must be continually modified to keep pace with these changes. At present, these changes are made at significant cost by a skilled programmer operating under the direction of a tax expert for each of the different jurisdictions.

What is needed is an apparatus and a method configurable for local jurisdictions that facilitates determining taxes without requiring extensive programming for individual tax jurisdictions.

SUMMARY

One embodiment of the present invention provides a system for determining taxes that is configurable for local jurisdictions. The system includes a tax knowledge base that provides the facility to store data pertaining to taxes in local jurisdictions, and a tax rule base that provides the facility to store rules for applying taxes in local jurisdictions. The system also includes a tax determination manager that determines the tax for a transaction using the tax knowledge base and, optionally, the tax rule base.

In one embodiment of the present invention, the system includes a tax services request manager for accessing the services of the tax determination manager upon receiving a request for tax processing.

In one embodiment of the present invention, the system includes an open subscription mechanism that provides the facility to specify the subset of data from the knowledge base and the rule base that would be used by the tax determination manager (or other service components) in servicing a request to the tax services request manager In one embodiment of the present invention, the system includes a record repository for storing the results of processing performed by the tax determination manager for one or more tax events.

In one embodiment of the present invention, the system includes a tax repository manager for storing and retrieving tax processing results to and from the record repository.

In one embodiment of the present invention, the system includes a tax configuration manager for maintaining the tax knowledge base and the tax rule base and managing the retrieval from and/or storage into external systems such.

In one embodiment of the present invention, the system includes a tax configuration manager that uses an open subscription mechanism to control the access for maintaining the tax knowledge base and the tax rule base.

In one embodiment of the present invention, the system includes a geography model for capturing the geographical boundaries of various jurisdictions associated with taxes of different tax regimes.

In one embodiment of the present invention, the system includes a trading community model for representing various parties, sites and locations involved in tax operations in a standardized format.

In one embodiment of the present invention, the system links the trading community model to the geography model, providing the ability to automatically determine the jurisdiction for a given tax of a given regime based on location information of parties and sites involved in the external business transaction.

In one embodiment of the present invention, the system includes a tax administration manager that determines the recoverability (i.e., whether a tax paid can be claimed back from the tax authority) and the extent of recovery (i.e., how much) of a tax, using the tax knowledge base and, optionally, the tax rule base.

In one embodiment of the present invention, the system includes a tax configuration manager that (1) can write information into the geography model, the trading community mode, and/or an inventory system; and (2) accesses information from the aforesaid components and provides information to a number of services including, but not limited to, the tax services request manager, tax determination manager and tax administration manager.

In one embodiment of the present invention, the system includes a tax administration manager that determines the amount to be settled with a tax authority for a given tax and a calendar period specified by the tax authority using the record repository, the tax knowledge base, and, optionally, the tax rule base.

In one embodiment of the present invention, the system includes a tax administration manager that interfaces with a payables system to enable the payment of the settlement amount determined by another process of the tax administration manager using the record repository, the tax knowledge base and, optionally, the tax rule base.

In one embodiment of the present invention, the system includes a tax administration manager that provides the facility for reconciling the amounts in the record repository with that existing in an accounting system.

Table 1 illustrates different tax regimes, tax jurisdictions, and taxes for different countries in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices, such as disk drives, magnetic tape, CDs (compact discs) and DVDs, and computer instruction signals embodied in a transmission medium (with or without a carrier wave upon which the signals are modulated). For example, the transmission medium may include a communications network, such as the Internet.

Distributed Computer System

Figure 1:
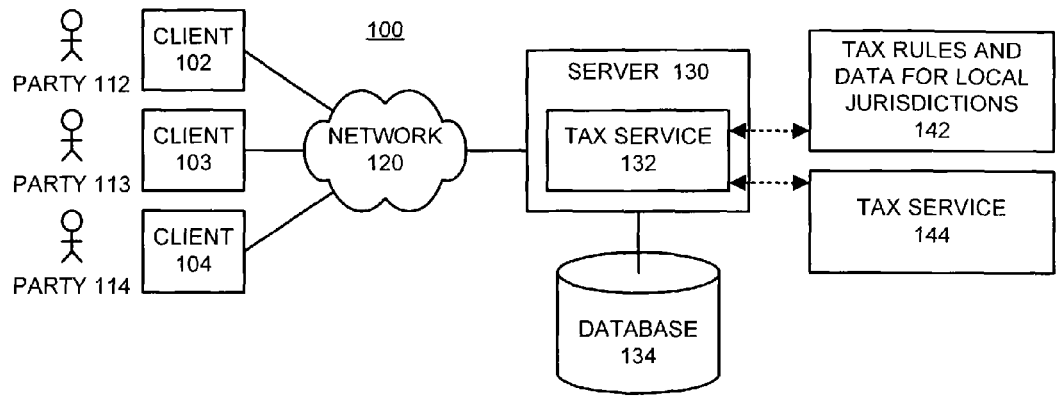
FIG. 1 illustrates a distributed computer system in accordance with an embodiment of the present invention.

FIG. 1 illustrates distributed computer system 100 in accordance with an embodiment of the present invention. Distributed computer system 100 includes a number of clients 102-104 coupled to a server 130 through a network 120.

Clients 102-104 can generally include any device on a network including computational capability and including a mechanism for communicating across the network. Clients 102-104 operate under control of parties 112-114, respectively. (Note that the term "parties" here refers to users of the computer system; it is not the same as the parties involved in taxable transactions.)

Server 130 can generally include one or more (interconnected) computing devices, including a mechanism for servicing requests from clients 102-104 for computational and/or data storage resources. Note that clients 102-104 and server 130 can generally include any type of computing device, including, but not limited to, a computer system based on a microprocessor, a mainframe computer, a digital signal processor, a portable computing device, a personal organizer, a device controller, and a computational engine within an appliance.

Network 120 can generally include any type of wire or wireless communication channel capable of coupling together computing nodes. This includes, but is not limited to, a local area network, a wide area network, or a combination of networks. In one embodiment of the present invention, network 120 includes the Internet.

Server 130 is coupled to a database 134, which contains data that is used by applications running on server 130. Note that these server-based applications may be running on behalf of remote applications on clients 102-104. Database 134 can generally include any type of system for storing data in nonvolatile storage. This includes, but is not limited to, systems based upon magnetic, optical, and magneto-optical storage devices, as well as storage devices based on flash memory and/or battery-backed up memory.

Server 130 acts as a host machine for tax service 132. This allows applications running on clients 102-104 to make requests across network 120 to tax service 132 running on server 130. For example, an application running on client 102 can send a request to tax service 132 to perform the tax calculation, including determination of the local jurisdictions involved and, further, performing the computations necessary for each of the local jurisdictions.

Note that tax service 132 is configured so that it can optionally receive tax rules and data for local Jurisdictions 142 from an external source, such as a tax expert for the local jurisdiction, prior to a request such as made by clients 102-104. Further, tax service 132 is configured to use tax rules and data received from an external source in servicing a request from a client. Furthermore, tax rules and data 142 can be encoded in a published format, such as extensible markup language (XML) or electronic data interchange (EDI) format, to facilitate receiving the tax rules and data 142 from different sources. Note that tax rules and data 142 can be communicated to tax service 132 across network 120.

Tax service 132 is additionally configured so that it can operate with an external tax service 144 provided by an external tax service provider. In this way, the external tax service provider can service the request with an operation (internal to tax service 144), such as a database lookup of a tax rate or a tax computation, in order to facilitate completing a tax operation for a specific jurisdiction by tax service 132. Furthermore, note that this external tax service provider may be located on a remote server that is accessible through network 120. A given request can be partially fulfilled by tax service 132 using tax rules and data 142 for one or more local jurisdictions, while using the tax service 144 of an external tax service provider to perform the computations for another local jurisdiction that might be simultaneously applicable.

Tax Service Structure

Figure 2:
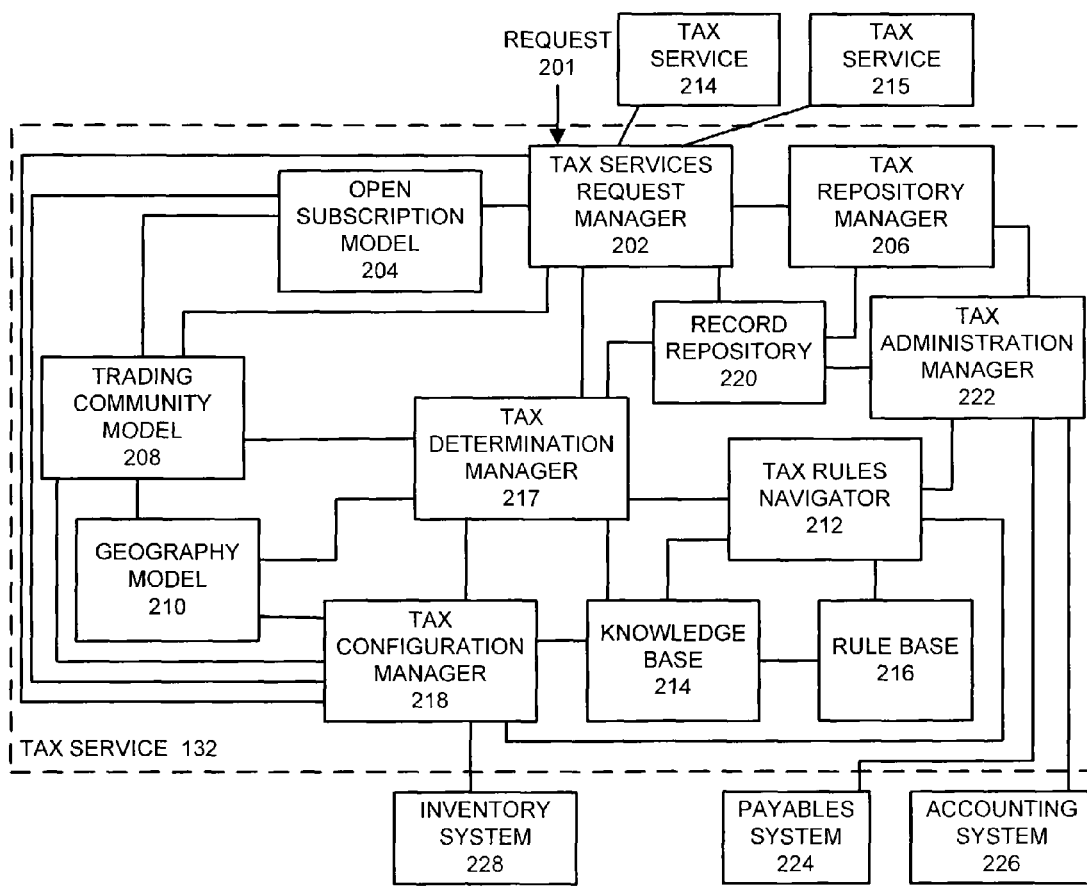
FIG. 2 illustrates the structure of a tax service in accordance with an embodiment of the present invention.

FIG. 2 illustrates the structure of tax service 132 in accordance with an embodiment of the present invention. Tax service 132 includes a number of modules, including tax services request manager (TSRM) 202, open subscription module 204, tax repository manager 206, trading community architecture (TCA) model 208, geography model 210, tax determination manager 217, tax rules navigator 212, tax configuration manager knowledge base 214, and rule base 216.

TSRM 202 generally manages interactions between external business transactions and tax processing operations. In one embodiment of the present invention, TSRM 202 is implemented as a set of published services that an external business application running on clients 102-104 may request. As is illustrated in FIG. 2, TSRM 202 receives a request 201 to perform a tax processing operation from an application running on one of clients 102-104.

Open subscription model 204 defines the security and access protocols used by TSRM 202 as well as tax rules navigator 212, tax determination manager (TDM) 217, tax configuration manager (TCM) 218 and tax administration manager 222. It also allows subscribers, such as parties 112-114, to select and receive services from either tax service 132 and/or various external service providers, such as tax service 144. During operation, open subscription module 204 communicates with trading community model 208, which represents various parties, sites and locations involved in the tax operations in a standardized format.

Tax repository manager 206 provides services that facilitate the storage into and retrieval of data from the record repository 220. These services are used by the tax determination manager 217 and tax administration manager 222.

Geography model 210 contains information about the geographical boundaries of the various jurisdictions associated with different tax regimes.

Tax configuration manager 218 provides services that can provide information from and/or can write information into, the geography model, the trading community model, an inventory system, tax services request manager 202, tax determination manager 217, tax rules navigator 212 and tax administration manager 222.

Tax rules navigator 212 facilitates access to tax data contained in knowledge base 214 and tax rules contained in rule base 216. Note that knowledge base 214 and tax rules 216 may actually reside within database 134 illustrated in FIG. 1.

Tax Service Operations Overview

Upon receiving a request 201 for tax processing, TSRM 202 uses the services of tax configuration manager 218 to identify the subscriber that will be used to plug into the open subscription model 204 to determine the data access and service subscriptions.

Tax determination manager (TDM) 217 is called by TSRM 202 to determine the local jurisdiction or jurisdictions for which tax computation needs to be performed. TDM 217 uses information from trading community model 208 and geography model 210 in ascertaining the local jurisdictions. Optionally, TDM 217 can use tax rules navigator 212 to access the necessary information contained within the knowledge base 214 and/or rule base 216.

After the local jurisdictions (for which tax must be computed) are identified, TSRM 202 invokes the services of either tax service 144 or TDM 217 to perform the computations for each of the identified local jurisdictions. In deciding whether to use tax service 144, TSRM 202 makes use of information in the open subscription model 204.

When the TDM 217 is used to perform the computations for one or more local jurisdictions, it makes use of services from tax configuration manager 218, trading community model 208 and geography model 210, as well as the tax rules navigator 212. (Tax rules navigator 212 is used to access relevant information from knowledge base 214 and rule base 216.)

TSRM 202 then invokes the services of TDM 217 to collect and summarize the information of the results of the various tax computations performed. In doing so, TDM 217 uses tax rules navigator 212 to access information from the knowledge base 214 and/or rule base 216. TSRM 202 then returns the information, summarized to the appropriate level as above, to the request 201.

Finally, depending on the setup within the TSRM 202 for the current event and the type of request 201, TSRM calls a service of tax repository manager 206 to store the results of tax processing performed for the request 201 by the system.

The above-described components work together to provide tax services as is described below with reference to FIGS. 3-6.

Details of the Operation of Tax Service

Figure 3:
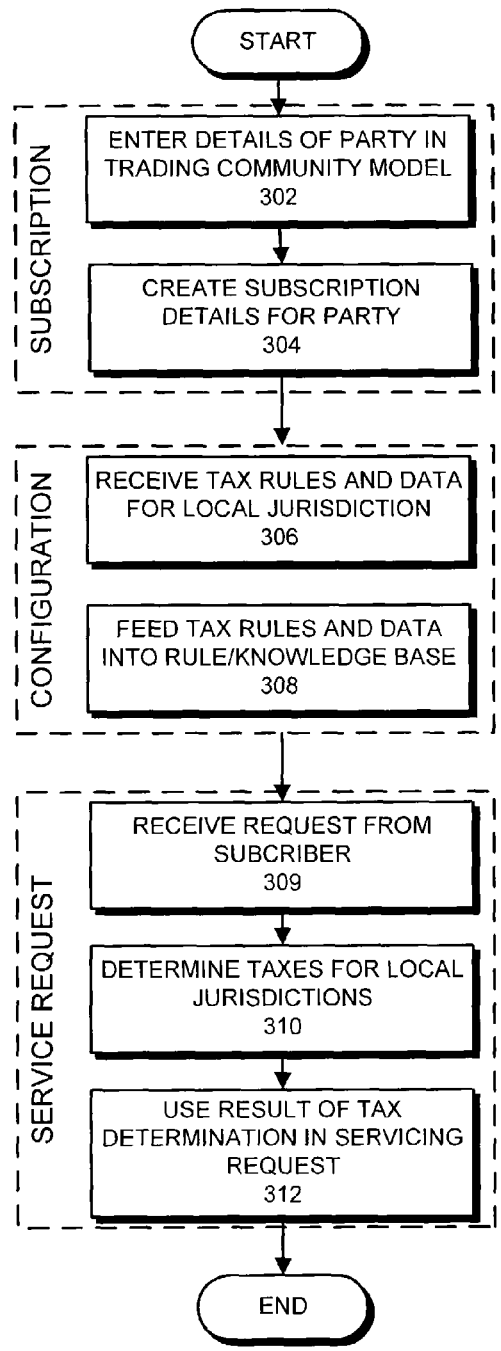
FIG. 3 is a flow chart illustrating operations performed by the tax service in accordance with an embodiment of the present invention.

FIG. 3 is a flow chart illustrating operations performed by tax service 132 in accordance with an embodiment of the present invention. The system initially captures details about the party, such as party 112, in the trading community model 208 (step 302) from a user operating on client, such as client 102. The user can further proceed to register the party, such as party 112, as a subscriber to the tax service 132 (step 304). In doing so, the system can register the subscriber to have access to one or more external services, such as tax service 144 and can enter other details such as data access and ownership privileges for one or more local jurisdictions.

The system can receive tax rules and data 142 for one or more local jurisdictions (step 306) through a data loading process. Or, a user can manually feed tax rules and data 142 into rule base 212 and knowledge base 214 using facilities provided by TDM 217 and TCM 218 (step 308). Or, a combination of both methods may be used to configure the system with data and rules.

Next, the system receives a request from the subscriber (step 309), wherein servicing the request may involve calculating a tax amount for one or more local jurisdictions. In response to this request, the system calculates the tax for each local jurisdiction that was identified above, by using the tax rules and tax data stored in knowledge base 214 and rule base 216 (step 310). The system subsequently uses a result of this calculation in order to service the request (step 312).

For example, the request from the subscriber may require the determination of taxes involving the sale of an item. To fulfill this request, the system first determines the local jurisdictions that need to be considered. In doing so, it may identify, for example, that a local sales tax is the only applicable tax, using the knowledge base 214 and, optionally, the rule base. The system could also determine the taxable basis and tax status for the local sales tax using the knowledge base 214 and again, optionally, use the rule base 216 to determine the taxable basis. Similarly, the system could lookup the tax rate from the knowledge base 214. The system may also determine that a reduced rate applies for the local sales tax, by applying a rule from rule base 216. Having the rate and the taxable basis, the system would then proceed to calculate the tax amount and perform any rounding that may be necessary. Then, the system can prepare the tax information for return to the transaction system that requested the service, and can record the information in the record repository if necessary.

Note that the service request may be initiated by an external system while performing a financial or a billing transaction to complete the sale.

Unlike prior tax computation systems, the above-described system allows new jurisdictional rules to be implemented by merely loading additional data and rules independent of the system that uses its services. Time-consuming programming is not required to effect changes in tax rules. Also, there is little or no necessity on the part of the calling system to be aware of such changes.

Overview of Taxes and Jurisdictions

To understand what a jurisdiction is, a brief description and a few examples of jurisdictions are provided.

Each country can have one or more systems of taxation each of which deals with the taxation of specific aspects of a business transaction. For example, a "Sales" type of taxation system deals with the rules and regulations of how a sales transaction should be taxed. Similarly, a "Value Added Tax" (or, "VAT") type of taxation system deals with how the value addition in a manufacturing and/or sales lifecycle needs to be taxed. This system of rules and regulations is called a tax regime. A tax regime is implemented by one or more distinct charges. Each such specific charge is called a tax. Therefore, a regime may include one or more different taxes. The imposition of a tax is limited typically by a geographical boundary, in most cases around a contiguous political/administrative area, such as a city or a county. However, in some cases, a tax may be imposed, or may vary owing to belonging to a non-political demarcation, such as a free-trade zone. The incidence of a tax on a geographical area is called a tax jurisdiction.

A jurisdiction may be created for a country, a state within a country, a county within a state, or a city within a county. In certain cases, a jurisdiction may need to encompass, for example, a couple of cities; or, a county and an adjoining city belonging to a neighboring county. Or, as explained above, jurisdictions may be created for areas such as free-trade zones, export processing zones, etc.

Table 1 illustrates different tax regimes, tax jurisdictions, and taxes for different countries. Table 1, reading from left to right, goes from the highest level to the most detailed level of granularity. There may be one or more tax regimes in a country; each regime can consist of one or more taxes; each tax is of a given tax type, which is a high level classification such as Sales Tax, Excise Tax and Mineral Oil Tax; and each tax can be levied in one or more tax jurisdictions (for one or more geographical elements).

Process of Determining Taxes Using the System

Figure 4:
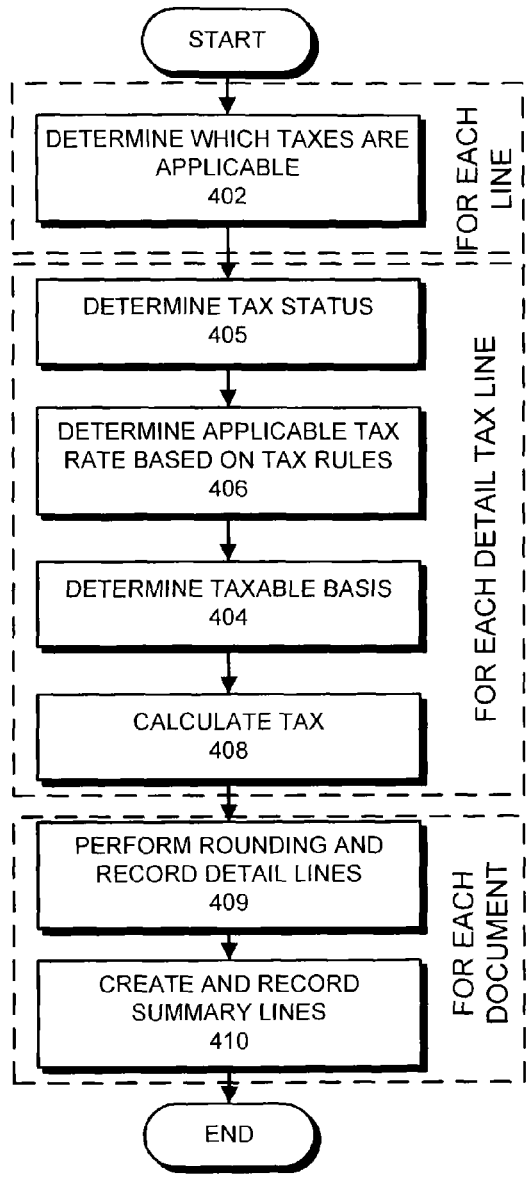
FIG. 4 is a flow chart illustrating the process of determining taxes in accordance with an embodiment of the present invention.

FIG. 4 is a flow chart illustrating the process of determining taxes in accordance with an embodiment of the present invention.

Process of Determining Applicable Tax Regimes

The system starts by determining which tax regimes are applicable (step 401) for each line of a document (for which request 201 is made).

Process of Determining Detail Tax Lines for a Tax Regime

For each tax regime determined applicable in step 401, the system (or, more specifically, TDM 217) determines the taxes and the tax jurisdictions that are involved, using the services of TCM 218, geography model 210 trading community model 208, knowledge base 214 and, optionally, the tax rules navigator 212 and tax rule base 216 (step 402).

TDM 217 creates a detail tax line and executes the steps 405, 406, 404 and 408, in that order, for each tax that is found applicable in step 402, utilizing other services and components as necessary.

TDM 217 determines the tax status for each applicable tax, using the knowledge base 214 and, optionally, the tax rules navigator 212 and tax rule base 216 (step 405).

TDM 217 then determines the tax rate, using the knowledge base 214 and, optionally, the tax rules navigator 212 and tax rule base 216 (step 406).

TDM 217 determines the taxable basis for each applicable tax, using the knowledge base 214 and, optionally, the tax rules navigator 212 and tax rule base 216 (step 404).

TABLE 1

| Country | Tax Regime | Tax | Tax Type | Tax Jurisdiction |
|---|---|---|---|---|
| United States | US Sales Tax | State Sales Tax | Sales Tax | California (State) |
| | US Sales Tax | District Tax | Sales Tax | San Francisco (City) |
| Canada | Canadian Goods and Services Tax | GST | VAT | Canada (Country) |
| | Canadian Goods and Services Tax | HST | VAT | New Brunswick (Province) |
| | Canadian Sales Tax | PST | Sales Tax | Ontario (Province) |
| Singapore | Singapore Goods and Services Tax | GST | VAT | Singapore (Country) |
| India | India Excise and Customs | Excise Tax | VAT | India (Country) |
| | India Excise and Customs | Additional Excise Tax | VAT | India (Country) |
| | India Excise and Customs | Customs Duty | Customs | India (Country) |
| Brazil | RICMS-Brazil ICMS Rules | ICMS | VAT | Sao Paulo (State) |
| | RICMS-Brazil ICMS Rules | ICMS-ST | VAT | Sao Paulo (State) |
| | RIPI-Brazil IPI Rules | IPI | VAT | Brazil (Country) |
| | RII-Brazil II Rules | II | Customs | Brazil (Country) |
| Portugal | Portugal VAT | Domestic VAT | VAT | Portugal (Country) |
| Portugal | Portugal VAT | Inter-EU VAT | VAT | Portugal (Country) |

This enables TDM 217 to subsequently calculate the tax involved in the transaction (step 408).

Process of Recording, Rounding and Creation of Summary Tax Lines

The system executes steps 409 and 410, in that order, for the document for which request 201 was made.

Tax repository manager 206 performs the rounding, and records the detail tax lines.

Tax repository manager 206 then performs other necessary document level actions including the generation and recording of summary tax lines (step 410).

The system then enables the requesting transaction to view and/or receive and/or store the tax information, possibly along with other non-tax-related transactional information. The transaction may at a subsequent point use this information to pass to an accounting system (see 220 in FIG. 2) capable of interpreting the same and creating the relevant accounting entries.

Knowledge/Rule Base Creation Independence of Request Fulfillment

Note that the above-described system is modularized so that the means of acquiring the data in the knowledge base 214 and/or the rule base 216 do not affect the means of fulfilling a service request.

In other words, gathering, receiving and storing data in the knowledge base 214 and/or the rule base 216 can be accomplished by using a computer readable format, either procured from a third party (provider) or obtained from other sources, such as a tax authority (responsible for administering one or more taxes in the local jurisdiction). It can also be entered manually by a tax professional/end user.

Further, note that the external business transaction making the request 201 does not need to be aware of the origin (or the method of collection) of the data that was used in fulfilling the request.

Process of Determining Taxes Using Tax Services External to the System

The process of servicing requests, such as request 201, from a subscriber can involve performing all determinations and calculations using the system, as described in the preceding section (Process of Determining Taxes using the System).

Figure 7:
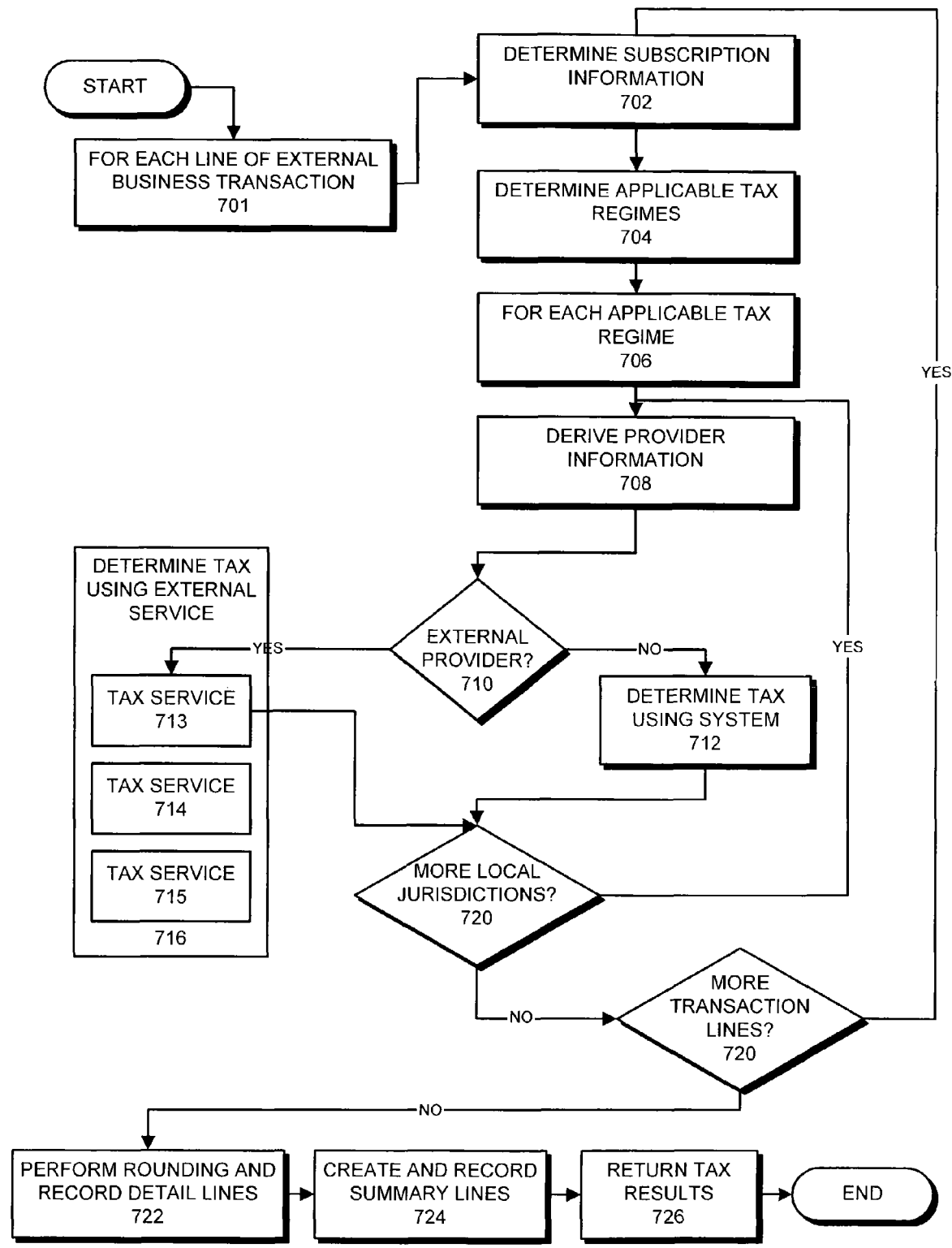
FIG. 7 is a flow chart illustrating the process of determining local taxes in accordance with an embodiment of the present invention.

Alternatively, request 201 may be fulfilled by utilizing tax determination and calculation services provided by one or more third parties, i.e., without using the tax determination and calculation services of tax service 132. As a variant, the system may also perform tax determination and calculation for certain jurisdictions using the services of the system while utilizing services provided by third parties for other jurisdictions. The process followed to service a request such as request 201 partially utilizing services of third parties is illustrated in FIG. 7.

This involves first determining all the tax regimes for which tax may need to be determined (704, 401). Next, for each tax regime, the system determines, using the Open Subscription Model (204), the identity of the third party—also called a "provider"—whose external service(s) 713-716, is needed to perform the determination and calculation for the tax regime (step 708).

If an external tax service such as tax service 713 is identified for a given tax regime (step 710), the system then sends a service request to the third party with the necessary details for the tax regime (713-716), and receives the tax details for the tax regime from the third party.

If no external tax service such as tax service 713 is identified for a given tax regime (step 710), the system determines taxes for the tax regime (FIG. 7, step 712) using TDM 217 primarily, along with other components and processes as described in Process of Determining Taxes using the System, and illustrated in FIG. 4, particularly steps 402, 405, 406, 404, and 408 (i.e., in the previous section entitled, Process of Determining Detail Tax Lines for a Tax Regime).

If there are other applicable tax regimes for the current line of the external business transaction (step 720), then processing begins for the next tax regime at step 708.

If there are no other applicable tax regimes for the current line of the external business transaction (step 720), then the system checks if there are any more transaction lines to be considered (step 721).

If there are any more transaction lines to be considered (step 721), the system begins processing for the next transaction line at step 701.

If there are no more transaction lines to be considered (step 721), the system begins processing at step 722 to perform actions at the level of the external business transaction or document.

Process of Recording, Rounding and Creation of Summary Tax Lines

Tax repository manager 206 collects, organizes and performs the rounding, and records the detail tax lines (steps 722, 409).

Tax repository manager 206 then performs other necessary document level actions including the generation and recording of summary tax lines (step 724, 410).

The system returns tax information (726) in the requisite level of summarization, thereby servicing the request, such as request 201.

Operations Performed by Tax Service

Figure 5:
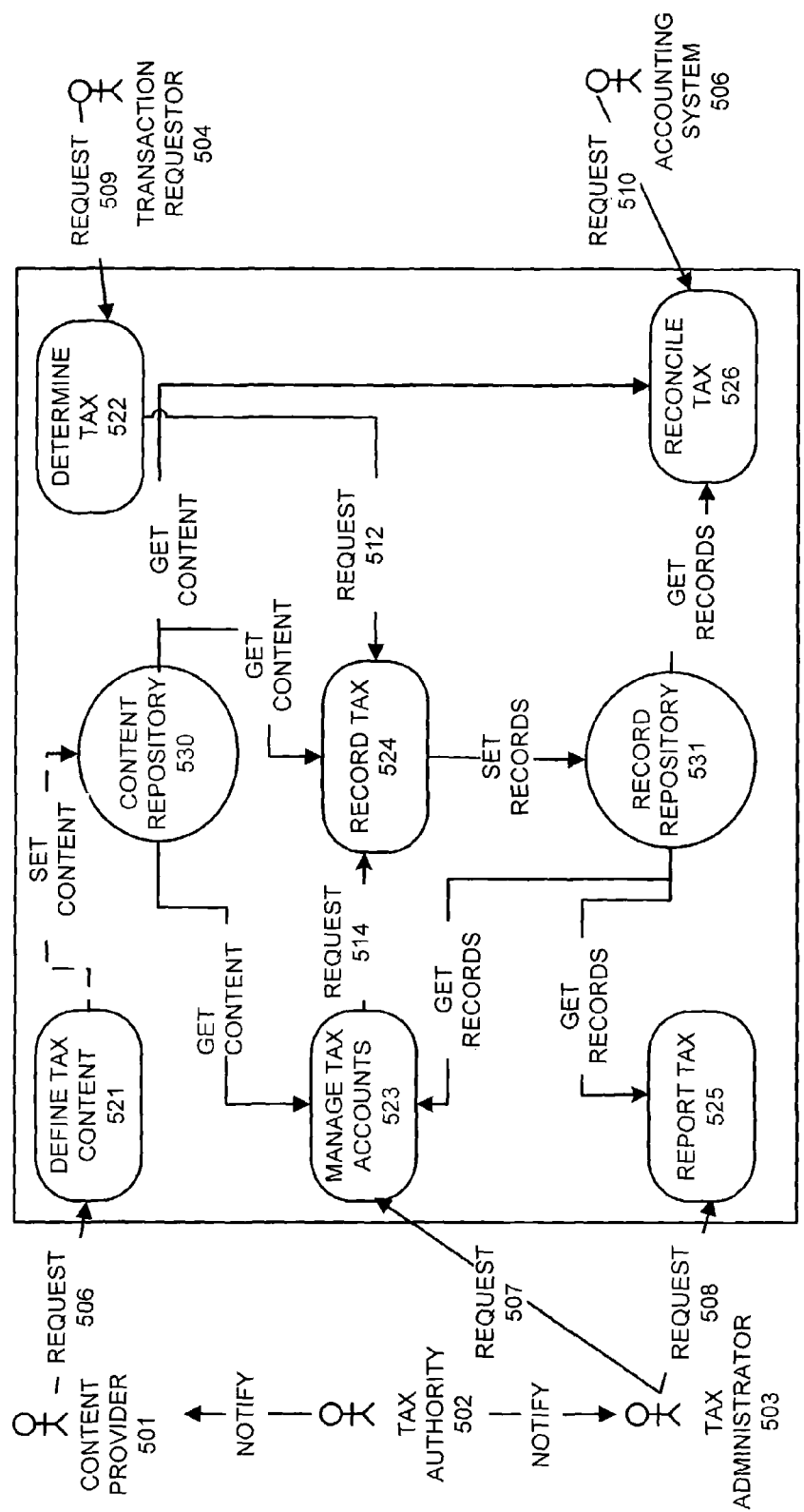
FIG. 5 is a diagram illustrating operations performed by the tax service in accordance with an embodiment of the present invention.

FIG. 5 is a diagram illustrating operations performed by tax service 132 in accordance with an embodiment of the present invention. The enterprise model illustrated in FIG. 5 represents the componentization of tax, that is, what tax is (as opposed to how it is implemented), and defines some key interactions. More specifically, FIG. 5 depicts a system that provides Tax Services, represented by the System Boundary and everything within it, and the outside world, represented by "actors" who interact with the system across the system boundary. An actor represents a person or system, external to the system under consideration, which interacts with the system in a specific role. For example, some of the actors in FIG. 5 are: Content Provider 501, Tax Authority 502, and Accounting System 506. Note that the processes defined within the box are essentially hidden from these actors.

The services provided by the system are the public face of the tax domain. Rather like an ATM machine, these services clearly announce what they will do. Moreover, clear instructions are provided on how to interact with tax service 132, and what to expect as an outcome.

To understand this diagram, consider an ATM as a system. Examples of actors are "Account Holder", "Maintenance Person" and "Currency Note Filler". External services are like the services that an "Account Holder" (actor) can avail of at an ATM—such as "Deposit Cash", and "Withdraw Cash". There may be different services available to other actors, such as", "Maintenance Person" and "Currency Note Filler". Internal Services are like "Debit Account", and "Confiscate Card" which cannot be seen by an actor.

Within the system boundary, the system providing tax services is composed of a number of services, such as the Define Tax Content service 521. The arrows emanating from an actor and which have "Request" alongside, are services which are "exposed" to the external world. Examples are manage tax accounts 523 and determine tax 522. Services such as record tax 524 are not allowed to be directly requested by an actor.

The services illustrated in FIG. 5 operate on a content repository 530 as well as a record repository 531. Content repository 530 includes knowledge base 214 and rule base 216. It is the primary source of tax information for tax services and includes knowledge about transaction-based taxes. A key interaction with content repository happens through the "define tax content" service 521, which is used to input data into content repository 530.

Record repository 531 stores information relating to tax events and tax status. It stores tax records along with any relevant changes to the tax records. Hence, it essentially contains the current, historical record of the results of interactions of the tax domain with the outside world. It also serves as a key source of information in: managing tax liabilities and assets with tax authorities; reporting taxpayer audit information on taxes collected or accrued; and in providing tax information for analysis and planning. A key interaction with record repository 531 happens through the "record tax" service 524.

The "define tax content" service 521 provides methods to manage permanent definitions within content repository 530 for the tax domain. These methods can include adding, updating, disabling, purging, validating or listing data.

The "determine tax" service 522 uses information from both content repository 530 and record repository 531 to determine the applicable taxes; determine the tax status for a given tax; determine the tax rate for a tax status of a specific tax; calculate the tax amount given the tax rate. It is composed of a number of internal services (not shown in the diagram), which make use of rules in the rule base 216 as well as the information contained in knowledge base 214.

The "manage tax accounts" service 523 provides a number of services to support administration, including the settlement of liabilities to a tax authority and recovery of amounts owed by a tax authority. The manage tax accounts service 523 may additionally maintain cumulative fiscal balances for a taxpayer and the current balances in tax authority specified registers.

The "record tax" service 524 is used to maintain record repository 531. It is typically called by other services, such as determine tax service 522 and manage tax accounts service 523.

The "report tax" service 525 manages and responds to the various reporting needs that a tax domain management system may have to fulfill in order to support tax administration. It generally enables the extract of raw data from record repository 531 in order to make it presentable to the outside world and/or adhere to format prescribed by a tax authority. Note that this raw data may be formatted into report form, or alternatively as a data set that is capable of being reformatted by a reporting tool.

The "reconcile tax" service 526 manages the process of reconciling the information in the record repository 531 with the information in an external accounting system. This is a requirement that a tax domain management system may have to fulfill in order to support tax administration in many local jurisdictions. It generally enables a tax user to identify the reasons why the accounting record of transactions is different from the tax record of transactions (as found in record repository 531).

Note that although FIG. 5 describes certain operations performed by Tax Service 132, only certain services have been described in detail.

Temporal View of Operations Performed by Tax Service

Figure 6:
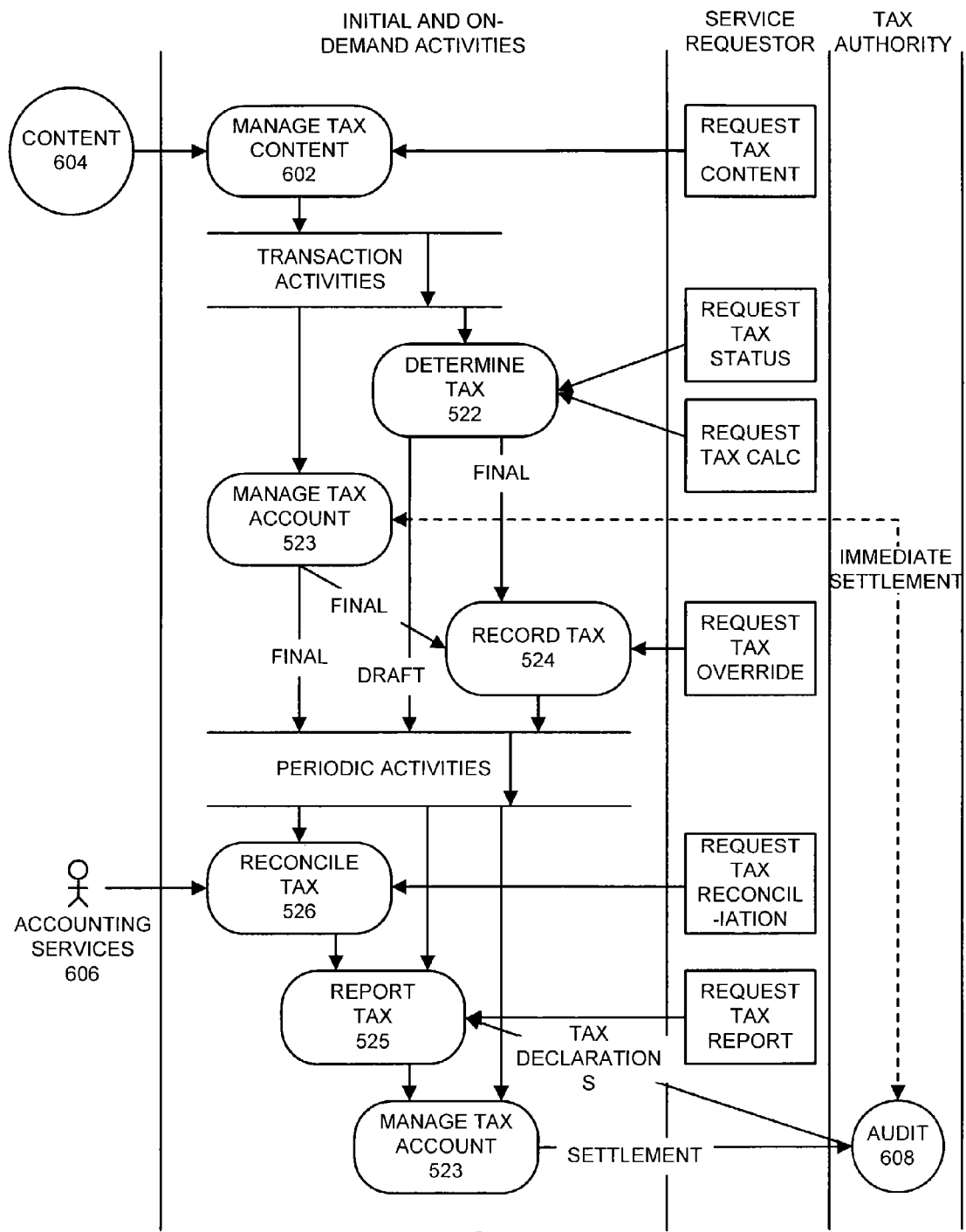
FIG. 6 is an activity diagram illustrating the temporal nature of operations performed by the tax service in accordance with an embodiment of the present invention.

FIG. 6 is an activity diagram illustrating the temporal nature of operations performed by tax service 132 in accordance with an embodiment of the present invention. FIG. 6 generally illustrates interactions that occur within the tax domain from the perspective of the three main "temporal" activities.

Note that diagram is split vertically into "swim lanes". The vertical bars between the swim lanes represent separation between actors. The passage of time is represented by vertical arrows from top to bottom. For example, a request to Determine Tax 522 happens after the request to Manage Tax Content 602 is completed. Horizontal lines represent a point in time. Activities represented by arrows flowing down to a horizontal line must be completed before any activity below the horizontal line can begin.

Each service can be accessed via an application programming interface (API), or alternatively through a message from an external requester. Once a request is passed to a service, the service is responsible for determining the relevant actions needed to fulfill the request.

A first set of activities are "occasional activities" that mainly involve setup and content management. These are actions that do not occur on a regular basis, and include actions such as purging, or requiring a service to upload revised or new tax information.

A second set of activities are "transaction activities" that occur more frequently and may require one or more services. These activities may include actions such as determining tax and managing tax account information.

A third set of activities are "periodic activities" that are performed routinely at periodic intervals. These activities can include preparing tax declarations and remittances to tax authorities for a given tax period.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An apparatus for determining taxes that is configurable for local jurisdictions, comprising:
    a tax knowledge base, embodied in a computer system, wherein the tax knowledge base includes tax data pertaining to tax rates in local jurisdictions;
    an external tax service interface, embodied in the computer system, configured to interface to a third party tax service provider to perform tax computations for another local jurisdiction which is simultaneously applicable;
    a tax rule base, embodied in the computer system,
        wherein the tax rule base includes one or more tax rules for applying taxes in local jurisdictions, and
        wherein the tax rules and the tax data comprise at least a tax regime and a tax jurisdiction; and
    a tax determination manager, embodied in the computer system, configured to determine an applicable tax corresponding to at least the tax regime and the tax jurisdiction at a given level of granularity, a taxable basis for the applicable tax, and a tax status for the applicable tax using the tax knowledge base and the tax rule base.

2. The apparatus of claim 1, further comprising a tax rules navigator that is used by the tax determination manager to navigate through rules to return the result or reference to a result for a tax determination process.

3. The apparatus of claim 1, further comprising a tax rules navigator that can be used by processes of a given tax service component, including the tax determination manager and a tax administration manager.

4. The apparatus of claim 1, further comprising a tax services request manager that is configured to access the tax determination manager upon receiving a tax request from a registered subscriber.

5. The apparatus of claim 4, further comprising an open subscription mechanism, wherein the open subscription mechanism includes security and access protocols used by the tax services request manager to control access to the tax determination manager.

6. The apparatus of claim 1, further comprising a record repository, wherein the record repository stores information relating to tax events and tax status.

7. The apparatus of claim 6, further comprising a tax repository manager, wherein the tax repository manager is configured to store and retrieve tax events and tax status to and from the record repository.

8. The apparatus of claim 1, further comprising a tax configuration manager, wherein the tax configuration manager is configured to update the tax knowledge base and the tax rule base.

9. The apparatus of claim 1, further comprising a geographical model, wherein the geographical model is used to configure the geographical boundaries of various jurisdictions associated with different tax regimes.

10. The apparatus of claim 1, further comprising a trading community model, wherein the trading community model represents various parties, sites and locations involved in tax operations in a standardized format.

11. The apparatus of claim 1, further comprising a tax administration manager, wherein the tax administration manager determines the recoverability and the extent of recovery of a tax.

12. The apparatus of claim 1, further comprising a tax administration manager, wherein the tax administration manager determines an amount to be settled with a tax authority for a given tax and a calendar period specified by the tax authority.

13. The apparatus of claim 1, further comprising a tax administration manager, wherein the tax administration manager interfaces with a payables system to enable the payment of a settlement amount determined by another process of the tax administration manager.

14. The apparatus of claim 1, further comprising a tax administration manager, wherein the tax administration manager provides a facility for reconciling the amounts in a record repository with that existing in an accounting system.

15. A method for determining taxes for local jurisdictions, comprising
receiving a request to provide a tax for a transaction from a subscriber;
determining a local jurisdiction for the transaction;
accessing a tax rule base and a tax knowledge base,
wherein the tax rule base includes one or more tax rules for applying taxes in local jurisdictions, and the tax knowledge base includes tax data pertaining to tax rates in local jurisdictions, and
wherein the tax rules and the tax data comprise at least a tax regime, and a tax jurisdiction;
calculating the tax for the local jurisdiction using the one or more tax rules from the tax rule base and the tax data from the tax knowledge base, wherein calculating the tax involves determining an applicable tax corresponding to at least the tax regime and the tax jurisdiction at a given level of granularity, a taxable basis for the applicable tax, and a tax status for the applicable tax;
using a third party service external to the system to perform tax computations for another local jurisdiction which is simultaneously applicable; and
returning the tax for the local jurisdiction to the subscriber.

16. The method of claim 15, further comprising:
determining a taxable basis from the transaction;
determining a tax status basis from the tax rule base;
determining a tax rate from the tax knowledge base; and
calculating the tax based on the taxable basis, the tax status basis, and the tax rate.

17. The method of claim 15, wherein receiving the request from the subscriber includes verifying that the subscriber is authorized to make the request.

18. The method of claim 15, further comprising allowing a user to update the tax rule base and the tax knowledge base, wherein updating the tax rule base and the tax knowledge base provides current data for the method.

19. A computer-readable storage medium storing instructions that when executed by a computer cause the computer to perform a method for determining taxes for local jurisdictions, comprising
receiving a request to provide a tax for a transaction from a subscriber;
determining a local jurisdiction for the transaction;
accessing a tax rule base and a tax knowledge base,
wherein the tax rule base includes one or more tax rules for applying taxes in local jurisdictions, and the tax knowledge base includes tax data pertaining to tax rates in local jurisdictions, and
wherein the tax rules and the tax data comprise at least a tax regime and a tax jurisdiction;
calculating the tax for the local jurisdiction using the one or more tax rules from the tax rule base and the tax data from the tax knowledge base, wherein calculating the tax involves determining an applicable tax corresponding to at least the tax regime and the tax jurisdiction at a given level of granularity, a taxable basis for the applicable tax, and a tax status for the applicable tax;
using a third party service external to the system to perform tax computations for another local jurisdiction which is simultaneously applicable; and
returning the tax for the local jurisdiction to the subscriber.

20. The computer-readable storage medium of claim 19, the method further comprising:
determining a taxable basis from the transaction;
determining a tax status basis from the tax rule base;
determining a tax rate from the tax knowledge base; and
calculating the tax based on the taxable basis, the tax status basis, and the tax rate.

21. The computer-readable storage medium of claim 19, wherein receiving the request from the subscriber includes verifying that the subscriber is authorized to make the request.

22. The computer-readable storage medium of claim 19, the method further comprising allowing a user to update the tax rule base and the tax knowledge base, wherein updating the tax rule base and the tax knowledge base provides current data for the method.

23. A means for determining taxes that is configurable for local jurisdictions, comprising:
a tax knowledge base means for providing tax data pertaining to tax rates in local jurisdictions;

a tax rule base means for providing one or more rules for applying taxes in local jurisdictions,
wherein the tax rules and the tax data comprise at least a tax regime and a tax jurisdiction;
an external tax service interface means for interfacing to a third party tax service provider to perform tax computations for another local jurisdiction which is simultaneously applicable; and
a tax determination manager means for determining an applicable tax corresponding to at least the tax regime and the tax jurisdiction at a given level of granularity using the tax knowledge base means and the tax rule base means.

24. The means of claim 23, further comprising a tax services request manager means for accessing the tax determination manager means upon receiving a tax request from a registered subscriber.

25. The means of claim 23, further comprising an open subscription means that includes security and access protocols used by the tax services request manager means to control access to the tax determination manager means.

26. The means of claim 23, further comprising a record repository means for storing information relating to tax events and tax status.

27. An apparatus that performs operations that need to be performed to meet the requirements of a local jurisdiction, comprising:
an external tax service interface, embodied in a computer system, configured to interface to a third party tax service provider to perform tax computations for another local jurisdiction which is simultaneously applicable
a tax service comprising:
a number of service components within the tax service, including a tax determination manager and a tax administration manager, wherein the tax determination manager is configured to determine an applicable tax corresponding to at least a tax regime and a tax jurisdiction at a given level of granularity; and
a number of utility components within the tax service, including,
a geography model,
a knowledge base which includes tax data pertaining to tax rates in local jurisdictions, and
a tax rule base which includes one or more tax rules for applying taxes in the local jurisdictions,
wherein the tax rules and the tax data comprise at least the tax regime and the tax jurisdiction.

28. The apparatus of claim 27, wherein service components can be broken down into a small number of well-defined processes to be executed by a tax service in a specific, predetermined order to fulfill the requirements imposed by a tax authority of a given local jurisdiction.

29. The apparatus of claim 27, wherein the tax rule base can accept rules for a given process of a service component to achieve a requisite result specified by a tax authority of a local jurisdiction.

30. The apparatus of claim 27, further comprising a tax rules navigator that operates on the tax rule base and returns a result, or a reference to a result, for a process of a service component for a given local jurisdiction.

* * * * *

UNITED STATES PATENT AND TRADEMARK OFFICE
CERTIFICATE OF CORRECTION

| | | |
|---|---|---|
| PATENT NO. | : 7,783,536 B2 | Page 1 of 1 |
| APPLICATION NO. | : 10/617349 | |
| DATED | : August 24, 2010 | |
| INVENTOR(S) | : J. William et al. | |

It is certified that error appears in the above-identified patent and that said Letters Patent is hereby corrected as shown below:

On sheet 2 of 5, in Figure 3, Box No. 309, line 2, delete "SUBCRIBER" and insert -- SUBSCRIBER --, therefor.

In column 2, line 26, delete "manager" and insert -- manager. --, therefor.

In column 4, line 51, delete "Jurisdictions" and insert -- jurisdictions --, therefor.

Signed and Sealed this
Tenth Day of May, 2011

David J. Kappos
*Director of the United States Patent and Trademark Office*